US010329826B2

(12) United States Patent
Li et al.

(10) Patent No.: US 10,329,826 B2
(45) Date of Patent: Jun. 25, 2019

(54) DRIVING MECHANISM (71) Applicant: JOHNSON ELECTRIC INTERNATIONAL AG, Murten (CH)

(72) Inventors: Yue Li, Hong Kong (CN); Jing Ning Ta, Hong Kong (CN); Yong Jun Zhao, Shenzhen (CN); Qiu Mei Li, Shenzhen (CN); Chui You Zhou, Shenzhen (CN); Yong Wang, Shenzhen (CN); Yong Li, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 92 days.

(21) Appl. No.: 15/282,804

(22) Filed: Sep. 30, 2016

(65) Prior Publication Data
US 2017/0089118 A1    Mar. 30, 2017

(30) Foreign Application Priority Data

Sep. 30, 2015 (CN) .......................... 2015 1 0642609
Dec. 25, 2015 (CN) .......................... 2015 1 0998632

(51) Int. Cl.
*E05F 15/697* (2015.01)
*F16H 37/04* (2006.01)
(Continued)

(52) U.S. Cl.
CPC ......... *E05F 15/697* (2015.01); *F16H 37/041* (2013.01); *F16H 57/039* (2013.01);
(Continued)

(58) Field of Classification Search
CPC .................................................. E05Y 2201/72
(Continued)

(56) References Cited

U.S. PATENT DOCUMENTS 2,701,973 A * 2/1955 Mackmann ........... E05F 15/692
475/4
2,899,832 A * 8/1959 Meyer ................... E05F 15/697
192/138
(Continued)

FOREIGN PATENT DOCUMENTS

| DE | 3741615 A1 * | 6/1989 | .............. E05F 11/44 |
| EP | 2423022 A2 * | 2/2012 | .............. B60J 7/0573 |
| JP | 2012047339 A * | 3/2012 | .............. B60J 7/0573 |

OTHER PUBLICATIONS

Machine translation of DE3741615A1.*

*Primary Examiner* — Marcus Menezes
(74) *Attorney, Agent, or Firm* — Muncy, Geissler, Olds & Lowe, P.C.

(57) ABSTRACT

A driving mechanism drives a vehicle window to move up and down. The driving mechanism includes a housing, and a driving assembly and a transmission assembly. The driving assembly is engaged with the transmission assembly. The driving assembly is partially received in the housing. The transmission assembly includes a first transmission member connected to the driving assembly, a second transmission member engaging with the first transmission member, and a planetary gear set. The planetary gear set connects to an external device. The driving assembly drives the first transmission member which in turn drives the second transmission member to rotate. The second transmission member drives the planetary gear set which in turn drives the vehicle window to move.

15 Claims, 5 Drawing Sheets

(51) Int. Cl.
| | |
|---|---|
| *F16H 57/039* | (2012.01) |
| *H02K 1/12* | (2006.01) |
| *H02K 1/27* | (2006.01) |
| *H02K 7/116* | (2006.01) |
| *H02K 21/12* | (2006.01) |
| *H02K 21/14* | (2006.01) |
| *H02K 1/14* | (2006.01) |
| *F16H 1/16* | (2006.01) |
| *F16H 1/28* | (2006.01) |
| *F16H 57/02* | (2012.01) |

(52) U.S. Cl.
CPC ............... *H02K 1/12* (2013.01); *H02K 1/146* (2013.01); *H02K 1/2706* (2013.01); *H02K 1/2753* (2013.01); *H02K 7/1166* (2013.01); *H02K 21/12* (2013.01); *H02K 21/14* (2013.01); *E05Y 2201/434* (2013.01); *E05Y 2201/72* (2013.01); *E05Y 2900/55* (2013.01); *F16H 1/16* (2013.01); *F16H 1/28* (2013.01); *F16H 2057/02034* (2013.01)

(58) Field of Classification Search
USPC .................................... 49/348, 349, 352, 351
See application file for complete search history.

(56) References Cited

U.S. PATENT DOCUMENTS

| | | | | | |
|---|---|---|---|---|---|
| 3,406,594 | A | * | 10/1968 | Pickles | F16H 1/32 475/162 |
| 5,440,186 | A | * | 8/1995 | Forsell | H02K 5/148 310/239 |
| 5,564,231 | A | * | 10/1996 | Tajima | E05F 15/697 49/352 |
| 5,749,173 | A | * | 5/1998 | Ishida | H01H 35/006 49/349 |
| 6,125,586 | A | * | 10/2000 | Buscher | F16H 1/28 49/352 |
| 6,460,295 | B1 | * | 10/2002 | Johnson | E05F 15/603 49/360 |
| 6,591,707 | B2 | * | 7/2003 | Torii | F16D 3/68 74/425 |
| 6,629,905 | B1 | * | 10/2003 | Sesselmann | E05F 11/483 254/344 |
| 8,011,136 | B2 | * | 9/2011 | Fukumura | E05F 15/646 475/338 |
| 2015/0042194 | A1 | * | 2/2015 | Li | H02K 21/16 310/156.01 |
| 2017/0328113 | A1 | * | 11/2017 | Li | E05F 15/431 |

* cited by examiner

DRIVING MECHANISM

CROSS REFERENCE TO RELATED APPLICATIONS

This non-provisional patent application claims priority under 35 U.S.C. § 119(a) from Patent Application No. 201510642609.3 filed in the People's Republic of China on Sep. 30, 2015; and from Patent Application No. 201510998632.6 filed in the People's Republic of China on Dec. 25, 2015.

FIELD OF THE INVENTION

The present disclosure relates to a driving mechanism.

BACKGROUND OF THE INVENTION

A vehicle window is usually driven by a driving mechanism to open and close. The driving mechanism generally includes a housing, a motor and a speed reduction transmission assembly disposed in the housing. The motor drives the vehicle window to open or close through the transmission assembly. The speed reduction transmission assembly is a worm and gear transmission assembly. However, the motor directly drives the worm and gear transmission assembly, which leads to unstable power output and low transmission efficiency.

Below, embodiments of the present disclosure will be described in detail with reference to the accompanying drawings.

DETAILED DESCRIPTION OF THE PREFERRED EMBODIMENTS

The technical solutions of the embodiments of the present disclosure will be clearly and completely described as follows with reference to the accompanying drawings. Apparently, the embodiments as described below are merely part of, rather than all, embodiments of the present disclosure. Based on the embodiments of the present disclosure, any other embodiment obtained by a person skilled in the art without paying any creative effort shall fall within the protection scope of the present disclosure.

Figure 1:
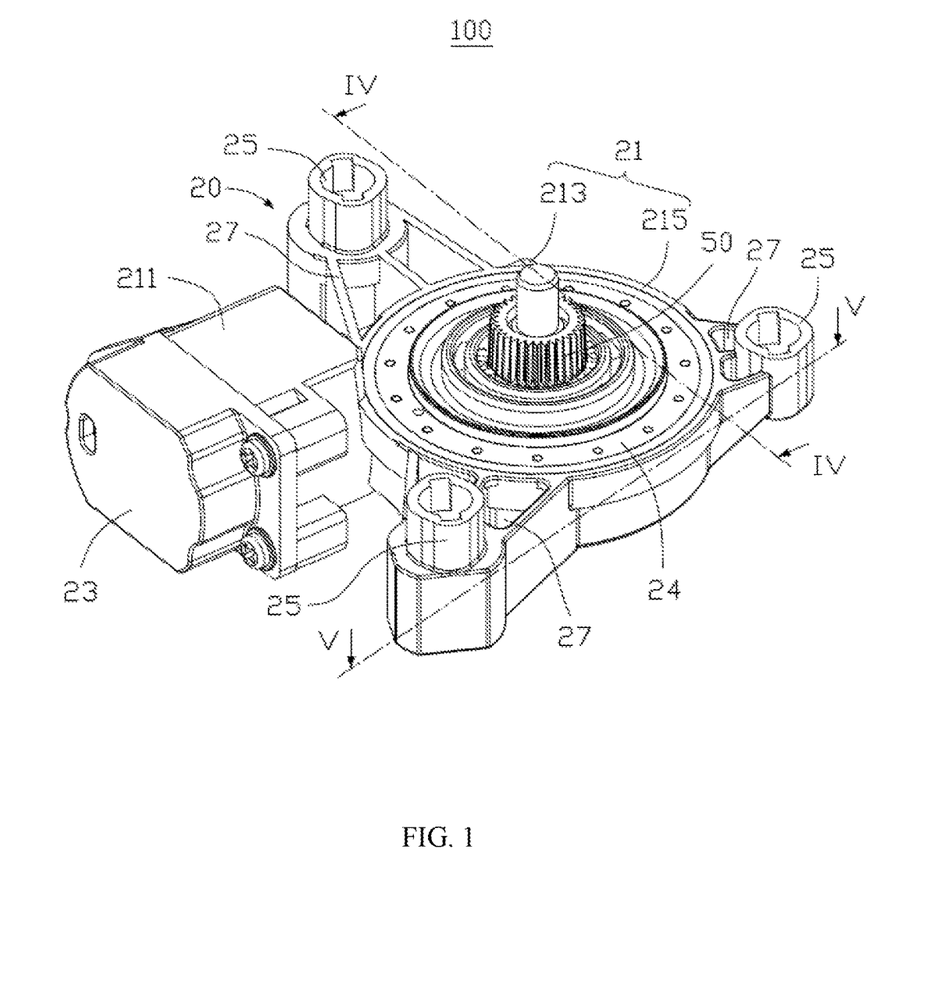
FIG. 1 is a perspective view of a driving mechanism according to one embodiment of the present disclosure.

Referring to FIG. 1, a driving mechanism 100 in accordance with one embodiment of the present disclosure is used to drive an external device (not shown) to rotate or drive the external device to translate through a transmission mechanism (not shown). In the embodiment, the external device may be a vehicle window. By controlling the driving mechanism 100, the vehicle window can be driven to open or close. Alternatively, the external device may be another movable device such as a wheel of a toy, an impeller, which will be described in detail below.

Figure 2:
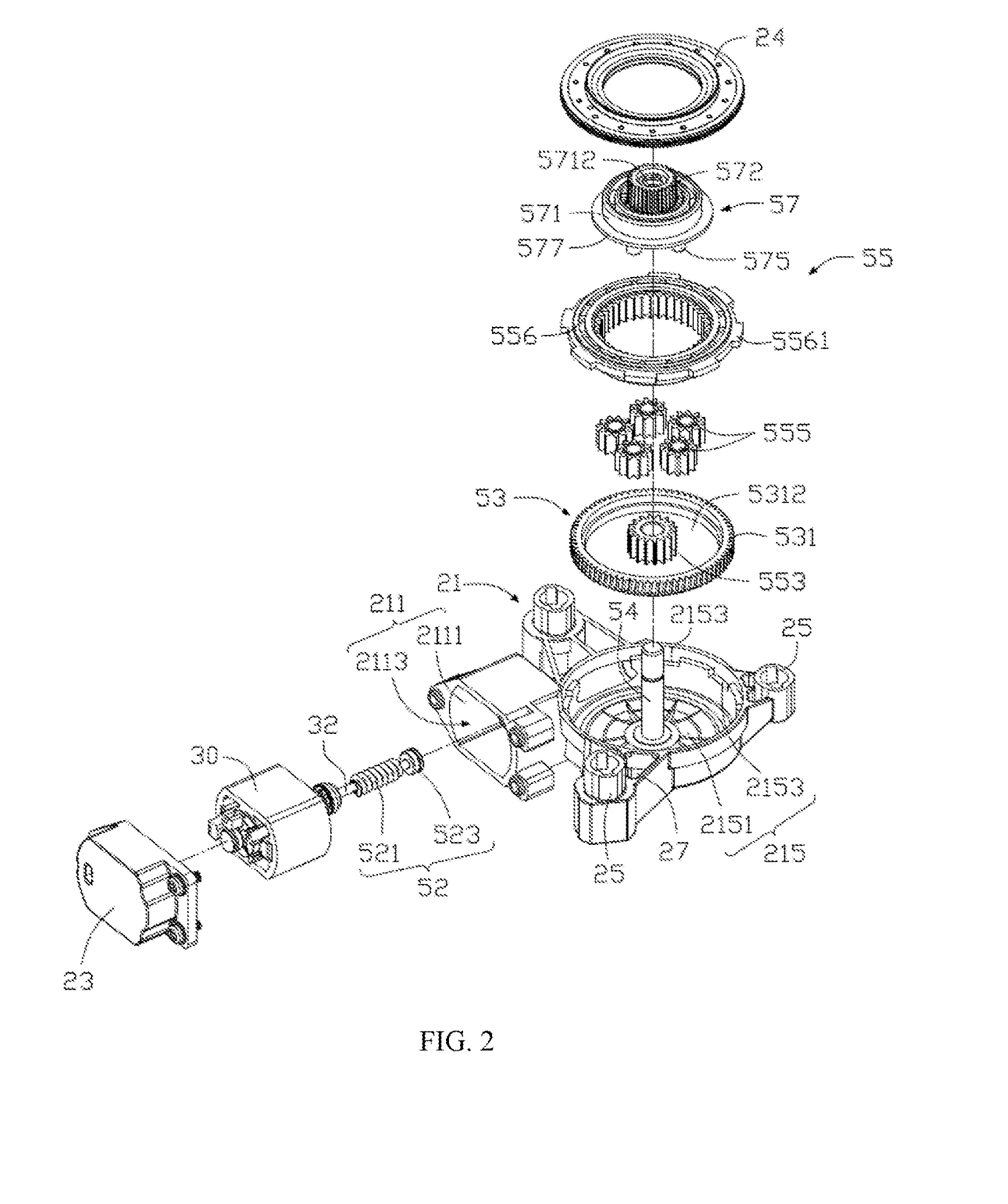
FIG. 2 is a perspective, exploded view of the driving mechanism of FIG. 1.

Referring to FIG. 1 and FIG. 2, the driving mechanism 100 includes a mounting assembly 20, a driving assembly 30, and a transmission assembly 50. In the embodiment, the driving assembly 30 and the transmission mechanism 50 are both disposed on the mounting assembly 20. The transmission assembly 50 is connected to the driving assembly 30. The mounting assembly 20 is configured to mount the driving mechanism 100 in the external device, for allowing the driving assembly 30 to drive the external device to move through the transmission assembly 50.

Figure 3:
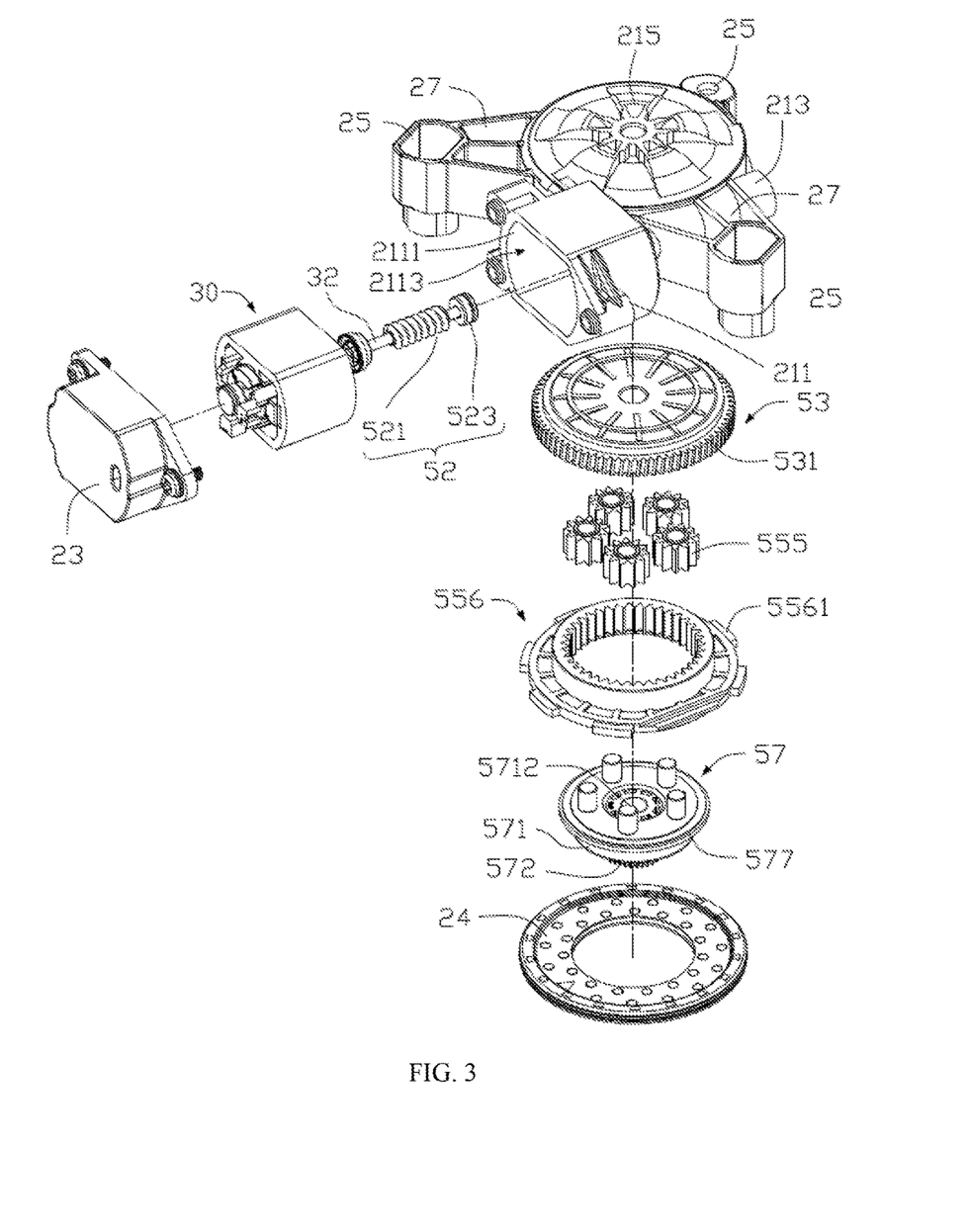
FIG. 3 is a perspective, exploded view of the driving mechanism of FIG. 2, viewed from another aspect.

Referring also to FIG. 2 and FIG. 3, the mounting assembly 20 includes a housing 21, a cover body 23, a cover plate 24, and a plurality of lugs 25. In the embodiment, the cover body 23 and the cover plate 24 cover the housing 21. The lugs 25 are used to mount the mounting assembly 20 to a mounting portion (not shown) such as a vehicle body or the vehicle window.

In the embodiment, the housing 21 is a gearbox, which receives the driving assembly 30 and the transmission assembly 50. The housing 21 includes a first receiving portion 211, and a second receiving portion 213 and a third receiving portion 215 (FIG. 3) disposed adjacent the first receiving portion 211.

The first receiving portion 211 defines a receiving chamber 2111 for receiving the driving assembly 30. The receiving chamber 2111 has an opening 2113. The receiving chamber 2111 communicates with the outside environment via the opening 2113.

Figure 5:
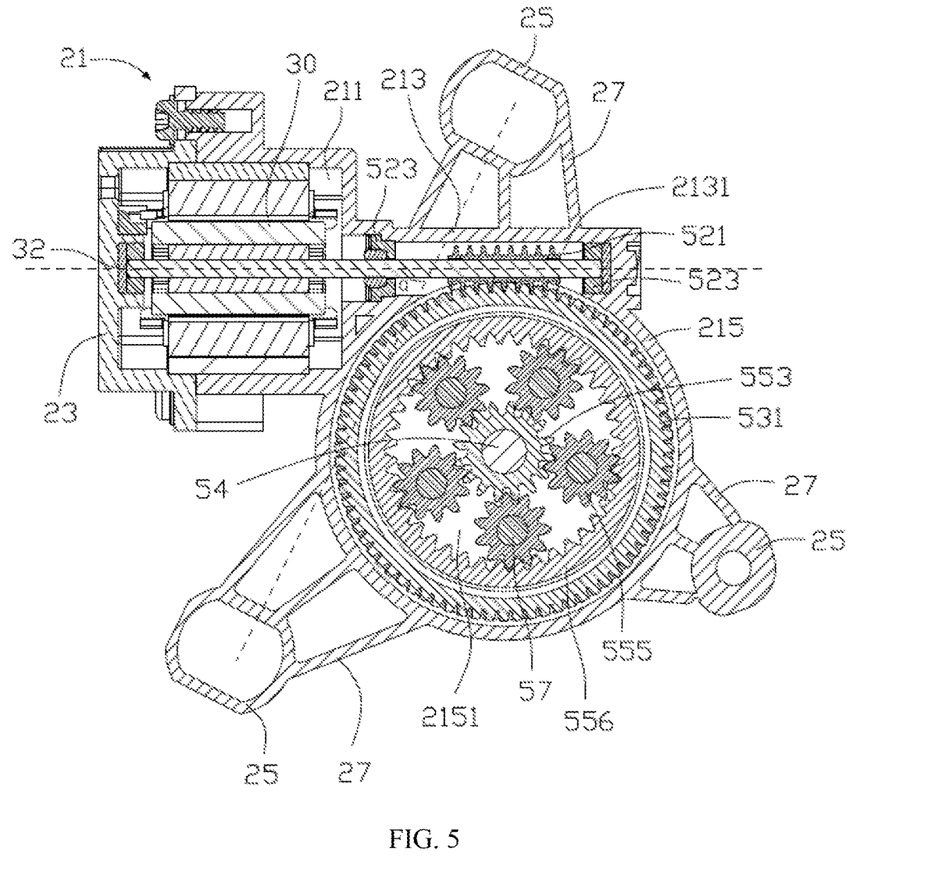
FIG. 5 is a sectional view of the driving mechanism of FIG. 1, taken along line V-V thereof.

In the embodiment, the second receiving portion 213 is generally a hollow cylindrical structure with an open end. The second receiving portion 213 is disposed on a side of the first receiving portion 211 opposite from the opening 2113. The second receiving portion 213 defines an axial accommodating chamber 2131 (FIG. 5). The accommodating chamber 2131 is used to partially receive the driving assembly 50. The accommodating chamber 2131 communicates with one end of the receiving chamber 2111 opposite from the opening 2113.

The third receiving portion 215 defines a receiving slot 2151 that is generally circular disc-shaped, for receiving the transmission assembly 50. The receiving slot 2151 communicates with the receiving chamber 2111 at one side of the receiving slot 2151, for allowing the transmission assembly 50 to engage with the driving assembly 30. The third receiving portion 215 further includes a plurality of latching grooves 2153 defined along an inner circumferential wall of the receiving slot 2151, for latching parts of the transmission assembly 50.

The cover body 23 covers the opening 2113 and is detachably connected with the housing 21. The cover body 23 is used to close the receiving chamber 2111, such that the receiving chamber 2111 and the receiving slot 2151 are substantially isolated from outside environment to achieve a dustproof seal. The cover plate 24 covers on the third receiving portion 215 to assemble the transmission assembly 50 in the third receiving portion 215. In the embodiment, the cover plate 24 is a hollow annular structure, such that one end of the transmission assembly 50 passes through the cover plate 24 to connect to the external device.

The lugs 25 are spacedly disposed on the third receiving portion 215. The lugs 25 are used to connect with the external device to mount the driving mechanism 100 to the external device. In the embodiment, the number of the lugs 25 is three. The three lugs 25 are generally disposed at three vertexes of a triangle which has an incircle coinciding with the outer circumference of the receiving slot 2151. In order to accommodate irregular mounting space, the height, position and size of each lug 25 may be properly adjusted, e.g. the heights of at least two lugs 25 are different from each other, so that the mounting assembly 20 can stably mount the driving mechanism 100 to the external device. In the embodiment, a line connecting the two lugs 25 adjacent the first receiving portion 211 and an axis of the first receiving portion 211 form an angle α therebetween (as shown in FIG. 5). The angle α satisfies the following conditions: $60° \leq \alpha < 90°$, so that the first receiving portion 211 is inclined in a direction toward to the third receiving portion 215. When the angle α is equal to 90°, in order to avoid interference between the lugs 25 and the first receiving portion 211, a length of the second receiving portion 213 along a direction parallel to an axial direction of a motor usually needs to be increased.

Referring to FIG. 5, in general, a distance between the two lugs 25 adjacent the first receiving portion 211 is a maximum longitudinal size of the driving mechanism. Making the first receiving portion 211 incline in the direction toward to the third receiving portion 215 can reduce a lateral maximum size of the driving mechanism 100, i.e. a size in the axial direction of the motor, to reduce an overall size of the driving mechanism 100, thus the driving mechanism 100 is suitable to be used in applications subject to great constraints of mounting space, such as a vehicle door which provides a small space for mounting of the vehicle driving mechanism 100.

Further, in order to reasonably reduce an overall weight of the mounting assembly 20 and to ensure a certain rigidity of the mounting assembly, part of the housing 21 and/or the lugs 25 are removed to form a plurality of hollow sections 27 spacedly arranged on the housing 21 and/or the lugs 25. In the embodiment, the hollow sections 27 are through-hole structures passing through the housing 21 and/or the lugs 25. It should be understood that the hollow sections 27 may also be groove structures formed in the housing 21 and/or the lugs 25.

Referring again to FIG. 2, in the embodiment, the driving assembly 30 includes a motor. The driving assembly 30 may be a single phase brushless motor or a three phase brushless motor. Preferably, the driving assembly 30 is an inner rotor brushless motor. The driving assembly 30 is partially received in the first receiving portion 211, for driving the transmission assembly 50 to operate which in turn drives the external device to move.

A large part of the driving assembly 30 is received in the first receiving portion 211 of the housing 21, and the cover body 23 covers one end of the driving assembly 30 and is fixedly connected to the housing 21, such that the driving mechanism 100 overall has a smaller size, and the size of the external device with the driving mechanism 100 can therefore be reduced.

In the embodiment, the driving assembly 30 is a single phase motor. A stator core of the motor is directly mounted within the first receiving portion 211 of the housing 21. As a result, an outer housing assembly for mounting the stator core in a traditional motor is omitted, which further reduces the size and weight of the external device with the driving mechanism 100.

The transmission assembly 50 is disposed in the second receiving portion 213 and the third receiving portion 215. The transmission assembly 50 is connected to an output shaft 32 of the driving assembly 30. The transmission assembly 50 is used to connect to and drive the external device to move.

Figure 4:
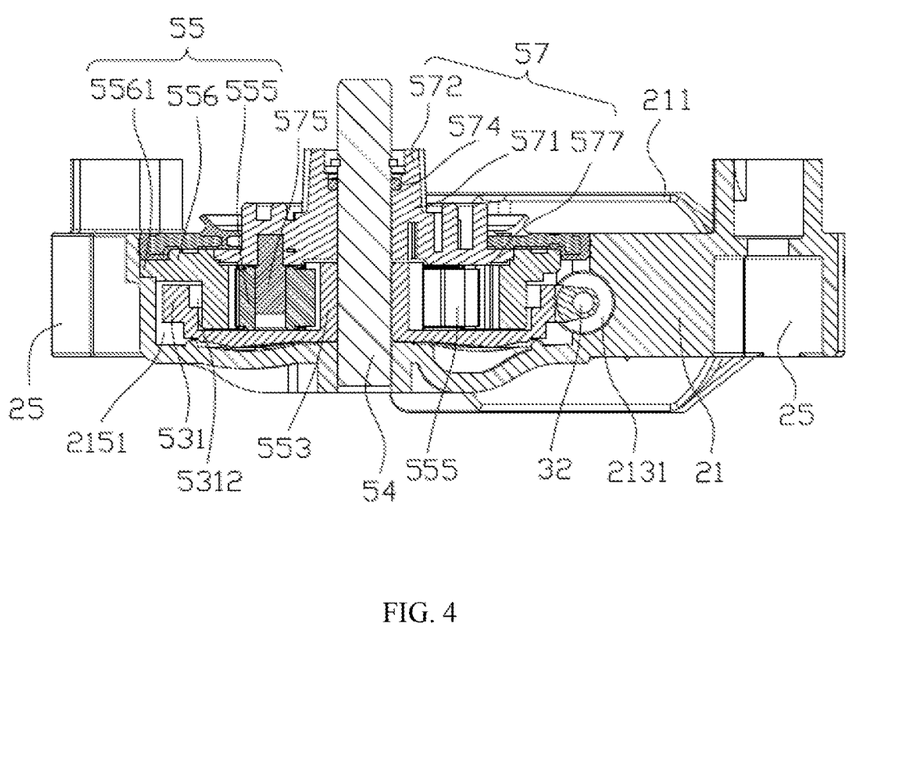
FIG. 4 is a sectional view of the driving mechanism of FIG. 1, taken along line IV-IV thereof.

The transmission assembly 50 includes a first transmission member 52, a second transmission member 53, an axle 54, a planetary gear set 55, and a connecting member 57. In the embodiment, the first transmission member 52 is disposed on the output shaft 32 of the driving assembly 30, the second transmission member 53 is disposed in the receiving slot 2151 (as shown in FIG. 4 and FIG. 5) and is connected to the first transmission member 52. One end of the axle 54 is fixed to a bottom wall of the receiving slot 2151, and the other end of the axle 54 sequentially passes through the second transmission member 53, the planetary gear set 55 and the connecting member 57.

In the embodiment, the first transmission member 52 is a worm structure, and the second transmission member 53 is a worm gear structure. The first transmission member 52 is mounted in the second receiving portion 213, and the second transmission member 53 is mounted in the third receiving portion 215. Specifically, an output end of the output shaft 32 of the driving assembly 30 is supported in the second receiving portion 213 of the housing 21 through two bearings 523. The two bearings 523 are mounted at two ends of the accommodating chamber 2131, respectively. In the embodiment, the first transmission member 52 includes a worm 521. The worm 521 is a hollow tubular structure with threads formed on an outer circumferential surface thereof. The worm 521 is attached over the output shaft 32 and located between the two bearings 523 for operatively engaging with the second transmission member 53. The worm 521 rotates relative to the mounting assembly 20 along with the output shaft 32. The second transmission member 53 is rotatably attached around the axle 54. The second transmission member 53 is disposed in the third receiving portion 215 and engaged with the worm 521 of the first transmission member 52.

Referring to FIG. 2 to FIG. 4, in the embodiment, the second transmission member 53 includes a worm gear 531 engaging with the worm 521. A groove 5312 is formed at one side of the worm gear 531, and the planetary gear set 55 is received in the groove 5312.

The planetary gear set 55 includes a sun gear 553, a plurality of planetary gears 555, and an internal ring gear 556. The sun gear 553 is fixed to one side of the worm gear 531 that defines the groove 5312 and rotates along with the worm gear 531. It should be understood that the worm gear 531 and the sun gear 553 may be integrally formed; alternatively, the sun gear 553 may be fixed to the worm 531 by injection molding, welding or adhesive.

The planetary gears 555 engage with the sun gear 553. The planetary gears 555 are rotatably received in the groove 5312 and surround the sun gear 553. In the embodiment, in order to achieve smoother transmission and higher load carrying capability of the transmission assembly 50, the number of the planetary gears 555 is five. In other embodiments, the number of the planetary gears 555 may be another value greater than or equal to two.

In the embodiment, the internal ring gear 556 is a generally annular internal gear structure. One end of the internal ring gear 556 is received in the groove 5312, and the second transmission member 53 is rotatably attached around an outer side of the internal ring gear 556. The internal ring gear 556 is attached around outer sides of the planetary gears 555. Each planetary gear 555 engaged with the sun gear 553 and the internal ring gear 556. A plurality of latching blocks 5561 is spacedly arranged along an outer circumferential side of the internal ring gear 556. Each of the latching blocks 5561 is engaged with a corresponding one of the latching slots 2153 (as shown in FIG. 2), such that the internal ring gear 556 is fixed relative to the receiving slot 2151.

One end of the connecting member 57 is connected to the planetary gears 555 and rotates under the driving of the planetary gears 555. The other end of the connecting member 57 connects to the external device to drive the external device to rotate or translate. In the embodiment, the connecting member 57 includes a main body 571, an output member 572, a sealing ring 574, and a plurality of connecting pins 575. The main body 571 defines a through axle hole 5712 (as shown in FIG. 2 and FIG. 3) in an axial direction, for allowing the axle 54 to pass therethrough to thereby rotatably attach the main body 571 around the axle 54. The output member 572 is disposed at one side of the main body 571 to connect to the external device. In the embodiment, a circumferential side of the output member 572 is provided with gear teeth (not labeled) for enabling the connecting member 57 to better drive the external device. The sealing ring 574 is received in the output member 572 and is coaxial with the axle hole 5712. The sealing ring 574 is rotatably attached around the axle 54 for resisting against between the axle 54 and an inner wall surface of the output member 572. It should be understood that the output member 572 may connect to the external device for transmission of the movement through a gear rack, a belt, a chain or a rope and, therefore, the circumferential side of the output member 572 may also be smooth or provided with grooves for engaging with the corresponding gear rack or belt for the transmission.

The number of the connecting pins 575 is the equal to the number of the planetary gears 555. The connecting pins 575 are arranged into a ring on a side of the main body 571 opposite from the output member 572. One end of each connecting pin 575 away from the main body 571 is received in a central hole (not labeled) of a corresponding one of the planetary gears 555, such that the planetary gear 555 can spin about the corresponding connecting pin 575. In the embodiment, the connecting member 57 further includes a resisting portion 577 formed along an outer edge of the circumferential side of the main body 571. One side of the resisting portion 577 resists against one side of the internal ring gear 556, such that an axial clearance is formed between the main body 571 and the planetary gears 555 to prevent a direct friction between one side of the main body 571 and the planetary gears 555.

The driving mechanism provided by the embodiment of the present disclosure can be utilized in a vehicle for driving parts of the vehicle to move. In particular, the driving mechanism can be used as a vehicle window driving mechanism. The vehicle may include a vehicle body, a door disposed on the vehicle body, and a vehicle window disposed on the door. The driving mechanism is disposed within the vehicle door and connected with the vehicle window through the transmission assembly 50. Preferably, the connecting member 57 of the transmission assembly 50 is connected to the vehicle window through another transmission part (such as a gear rack), so as to convert the rotation of the driving assembly 30 into translation of the vehicle window. Controlling the rotation of the driving assembly 30 can control the translation of the vehicle window relative to the vehicle door, thus opening or closing the vehicle window. Because the driving mechanism of the present disclosure has the advantages of small size and lightweight, it occupies a smaller mounting space within the vehicle door and can be firmly mounted. In the embodiment, other structures of the vehicle are known structures, which are not described herein in detail.

The driving mechanism of the present disclosure utilizes multiple stages of speed reduction transmission. For example, in the above embodiment, a stage of planetary gear transmission is added in addition to the worm and gear transmission. That is, the worm and gear performs a first stage of speed reduction, and the planetary gear set performs a second stage of speed reduction, thereby increasing the transmission ratio of the whole transmission assembly 50 and achieves good speed reduction result, which makes the power output more stable and smoother, such that a final large torque output can be achieved with a small driving force outputted by the driving assembly 30.

Although the invention is described with reference to one or more embodiments, the above description of the embodiments is used only to enable people skilled in the art to practice or use the invention. It should be appreciated by those skilled in the art that various modifications are possible without departing from the spirit or scope of the present disclosure. The embodiments illustrated herein should not be interpreted as limits to the present disclosure, and the scope of the invention is to be determined by reference to the claims that follow.

The invention claimed is:

1. A driving mechanism, comprising:
a housing;
a driving assembly and a transmission assembly disposed in the housing;
the transmission assembly having a first transmission member connected to the driving assembly, a second transmission member and a planetary gear set;
wherein the first transmission member comprises a worm, the second transmission member comprises a worm gear engaging with the worm; the planetary gear set comprises a sun gear which is non-rotatably fixed to a bottom of the worm gear along an axle of the driving assembly; one side of the worm gear defines a groove, the planetary gear set is rotatably received in the groove; the planetary gear set is coupled to an external device, the driving assembly drives the second transmission member via the first transmission member, the second transmission member drives the external device to move via the planetary gear set.

2. The driving mechanism of claim 1, wherein the driving assembly is partially received in the housing, the housing comprises a first receiving portion, and a second receiving portion and a third receiving portion adjacent the first receiving portion, the first receiving portion defines a receiving chamber for receiving the driving assembly, the second receiving portion defines an accommodating chamber, the third receiving portion defines a receiving slot, the accommodating chamber is in communication with one end of the receiving chamber, the receiving slot is in communication with the accommodating chamber; the first transmission member is mounted in the accommodating chamber, and the second transmission member is mounted in the receiving slot.

3. The driving mechanism of claim 2, wherein the driving assembly comprises a connecting member, and one end of the axle is mounted to a bottom wall of the receiving slot and the other end of the axle sequentially passes through the worm gear, the planetary gear set and the connecting member.

4. The driving mechanism of claim 3, wherein the planetary gear set further comprises a plurality of planetary gears, and an internal ring gear; the plurality of planetary gears engage with the internal ring gear; and one end of the connecting member is coupled to the plurality of planetary gears and the other end of the connecting member is coupled to the external device.

5. The driving mechanism of claim 4, wherein a plurality of latching grooves is arranged along an inner circumferential wall of the receiving slot, the internal ring gear comprises plurality of latching blocks formed at an outer circumferential side thereof, and the latching blocks are engaged in the latching grooves.

6. The driving mechanism of claim 4, wherein the connecting member comprises a plurality of connecting pins, each of the plurality of planetary gears corresponds to and rotates around one connecting pin.

7. The driving mechanism of claim 6, wherein the connecting member comprises a main body, an output member, a sealing ring, the output member and the plurality of connecting pins are disposed on two opposite sides of the main body, the sealing ring is mounted in the output member.

8. The driving mechanism of claim 7, wherein an abutting portion formed along an outer edge of a circumferential side of the main body, and one side of the abutting portion resists against one side of the internal ring gear.

9. The driving mechanism of claim 4, wherein driving mechanism further comprises a cover body, a cover plate and lugs, the cover body covers an open end of the receiving chamber, the cover plate covers an open end of the accommodating chamber, the lugs are disposed on the third receiving portion.

10. The driving mechanism of claim 9, wherein the number of the lugs is three, and the three lugs are disposed at three vertexes of a triangle which has an incircle coinciding with an outer circumference of the receiving slot.

11. The driving mechanism of claim 9, wherein a line connecting two lugs adjacent the first receiving portion and an axis of the first receiving portion form an angle α therebetween, the angle α satisfies the following conditions: $60° \leq \alpha < 90°$.

12. The driving mechanism of claim 2, wherein the driving assembly comprises an inner rotor single phase motor.

13. A driving mechanism to drive an external device, comprising:
a housing;
a driving assembly disposed in the housing,
a transmission assembly disposed in the housing; and
the driving assembly comprising a single phase motor to drive the external device via at least two stages of a speed reduction mechanism of the transmission assembly; and
wherein the at least two stages of the speed reduction mechanism comprises a first stage of the speed reduction mechanism having a worm and a worn gear, a second stage of the speed reduction mechanism having a sun gear and a planetary gear set, the sun gear is non-rotatably fixed to a bottom of the worm gear and one side of the worm gear defines a groove, the planetary gear set is rotatably received in the groove.

14. A vehicle, comprising:
the driving mechanism of claim 1 having a single phase motor to drive a vehicle window to open and close.

15. The driving mechanism of claim 1, wherein the sun gear and the bottom of the worm gear are disposed without any space therebetween.

* * * * *